(12) United States Patent
Stoloff

(10) Patent No.: US 8,905,217 B2
(45) Date of Patent: Dec. 9, 2014

(54) PARK SLOW RELEASE

(75) Inventor: Paul H. Stoloff, Farmington Hills, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 204 days.

(21) Appl. No.: 13/287,239

(22) Filed: Nov. 2, 2011

(65) Prior Publication Data

US 2013/0105269 A1     May 2, 2013

(51) Int. Cl.
| | | |
|---|---|---|
| *B60W 10/10* | (2012.01) | |
| *B60W 10/18* | (2012.01) | |
| *B60W 10/188* | (2012.01) | |
| *B60W 30/18* | (2012.01) | |
| *F16H 63/48* | (2006.01) | |

(52) U.S. Cl.
CPC ........... *B60W 10/182* (2013.01); *B60W 10/188* (2013.01); *B60W 2510/186* (2013.01); *B60W 2540/16* (2013.01); *B60W 2510/182* (2013.01); *B60W 30/181* (2013.01); *F16H 63/486* (2013.01)
USPC ............................. 192/219; 303/191; 192/221

(58) Field of Classification Search
CPC ................. B60W 30/18109; B60W 30/18118; B60W 2510/18; B60W 2550/142
USPC .................................................. 192/219, 221
See application file for complete search history.

(56) References Cited

U.S. PATENT DOCUMENTS

| | | | |
|---|---|---|---|
| 6,305,511 | B1 | 10/2001 | McCann et al. |
| 6,325,471 | B1 | 12/2001 | Curran et al. |
| 7,311,639 | B2 | 12/2007 | James et al. |
| 8,371,986 | B2 * | 2/2013 | Heuver ........................... 477/94 |
| 8,589,046 | B2 * | 11/2013 | Pothin et al. .................... 701/70 |
| 2009/0192019 | A1 * | 7/2009 | Groner et al. ................. 477/195 |

* cited by examiner

*Primary Examiner* — Troy Chambers
*Assistant Examiner* — Lillian Nguyen
(74) *Attorney, Agent, or Firm* — Ralph E Smith

(57) ABSTRACT

A controller is provided and may monitor a pressure of brake fluid and a state of a transmission of a vehicle. The controller may maintain predetermined brake pressure below a threshold pressure required to prevent movement of the vehicle in response to movement of the transmission into a park state and in response to a drop in brake pressure below the threshold pressure to permit the vehicle to roll with resistance for a predetermined time following the drop of brake pressure below the threshold pressure.

16 Claims, 4 Drawing Sheets

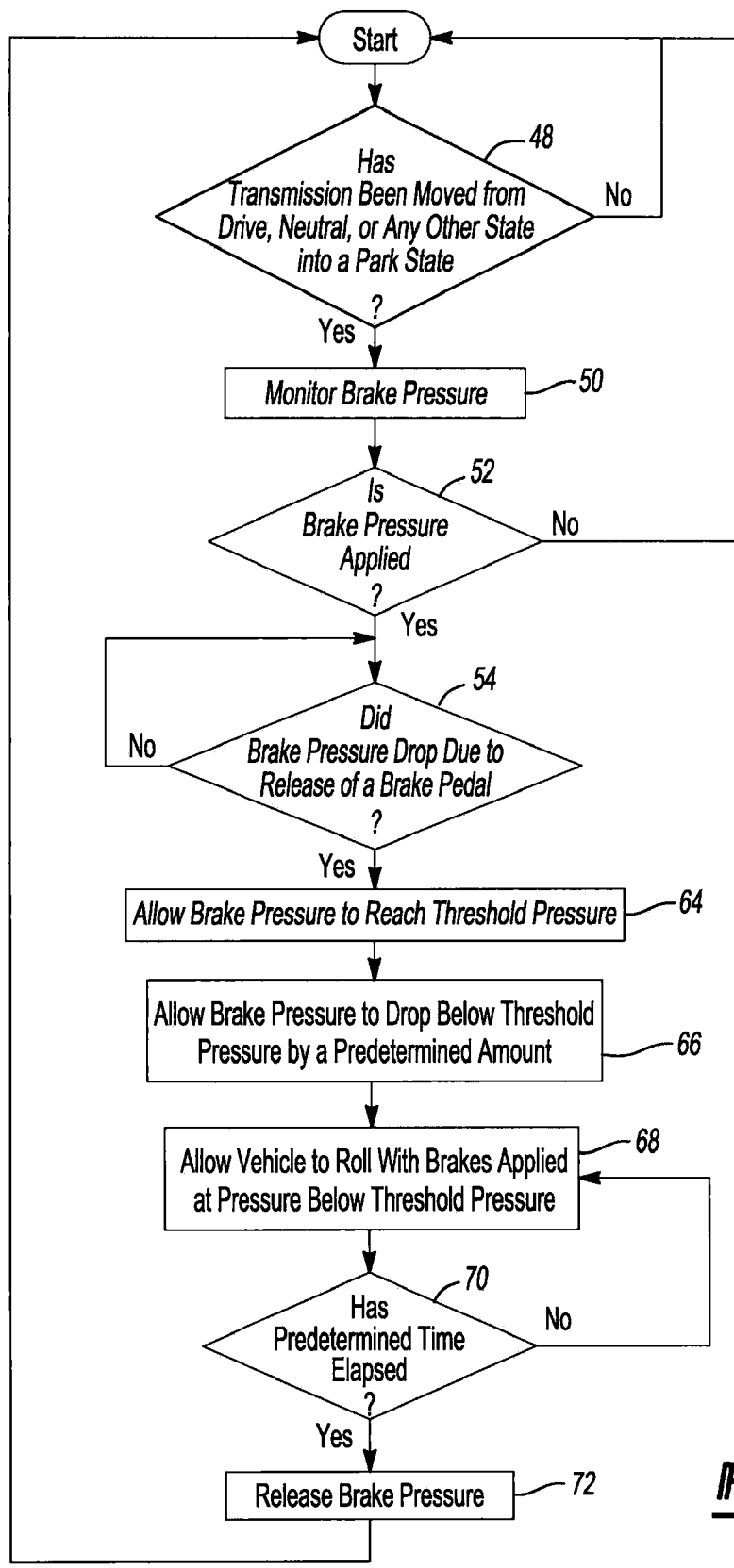

PARK SLOW RELEASE

FIELD

The present disclosure relates to control systems and more particularly to a control system for a vehicle brake system.

BACKGROUND

Modern vehicles are typically equipped with an automatic transmission that automatically selects an appropriate combination of gears when a vehicle is in use. Such modern transmissions are typically in communication with a gear-shift unit that permits a user to control operation of the vehicle by manipulating the transmission into a variety of states. For example, a gear-shift unit may provide a user with the ability to place the transmission in one of at least two drive states, a neutral state, a reverse state, and a park state.

When the transmission is moved into a drive state, a neutral state, or a reverse state, a series of mechanical elements within the transmission are typically employed to provide a desired rotational output of a shaft of the transmission and, thus, a desired operation of the vehicle. For example, if a drive state is selected by a user by placing the gear-shift unit in a drive state, the transmission employs a series of internal clutches and gears to provide the output shaft with a desired rotational speed and. Similarly, when a user places the transmission in a park state, a parking sprag of the transmission is typically engaged to prevent rotation of the output shaft of the transmission and, thus, rotation of the wheels of the vehicle.

When a gear-shift unit is placed in a park state, the parking sprag may not be lined up with a mating recess or slot of an internal gear of the transmission. As such, the vehicle may be permitted to move slightly upon movement of the gear-shift unit into the park state until the parking sprag is received within the recess or slot of the internal gear. While such movement of the vehicle is typically minimal (i.e., an inch or two), following such movement, the sprag drops into the recess or slot of the internal gear and causes the vehicle to come to an abrupt stop.

Causing the vehicle to come to an abrupt stop following movement of the parking sprag into the recess or slot of the internal gear creates an undesirable situation for the user due to the jerking motion of the vehicle typically associated with stopping the vehicle abruptly. Further, while movement of the vehicle is minimal following movement of the gear-shift unit into the parked state, such movement typically creates an unsettled feeling for the user, as the user does not expect movement of the vehicle following movement of the gear-select unit into the park state.

SUMMARY

In one configuration, a controller is provided and may monitor a pressure of brake fluid and a state of a transmission of a vehicle. The controller may maintain a predetermined brake pressure below a threshold pressure required to prevent movement of the vehicle in response to movement of the transmission into a park state and in response to a drop in brake pressure below the threshold pressure to permit the vehicle to roll with resistance for a predetermined time following the drop of brake pressure below the threshold pressure.

In another configuration, a brake system for a vehicle is provided and may selectively prevent movement of the vehicle when brake fluid of the brake system is at or above a threshold pressure. A transmission may be operable in a plurality of states including a park state and a controller may be in communication with the brake system and the transmission. The controller may maintain a predetermined pressure of the brake fluid at a pressure below the threshold pressure to apply the brake system and permit the vehicle to move with resistance in response to a drop in brake pressure below the threshold pressure and in response to movement of the transmission into the park state.

A method is provided and may include monitoring a state of a transmission of a vehicle and monitoring a pressure of brake fluid supplied to a brake system of the vehicle. The method may further include maintaining the brake pressure at a predetermined pressure below a threshold pressure required to prevent movement of the vehicle in response to the transmission being moved into a park state and in response to the pressure dropping below the threshold pressure. The method may further include maintaining the predetermined pressure below the threshold pressure for a predetermined time following the pressure drop below the threshold pressure and permitting the vehicle to roll with resistance for the predetermined time.

Further areas of applicability of the present disclosure will become apparent from the detailed description, drawings and claims provided hereinafter. It should be understood that the detailed description, including disclosed embodiments and drawings, are merely exemplary in nature, intended for purposes of illustration only, and are not intended to limit the scope of the invention, its application or use. Thus, variations that do not depart from the gist of the invention are intended to be within the scope of the invention.

BRIEF DESCRIPTION OF THE DRAWINGS

FIG. 5 is a flowchart detailing operation of the controller of FIG. 1.

DETAILED DESCRIPTION

Figure 1:
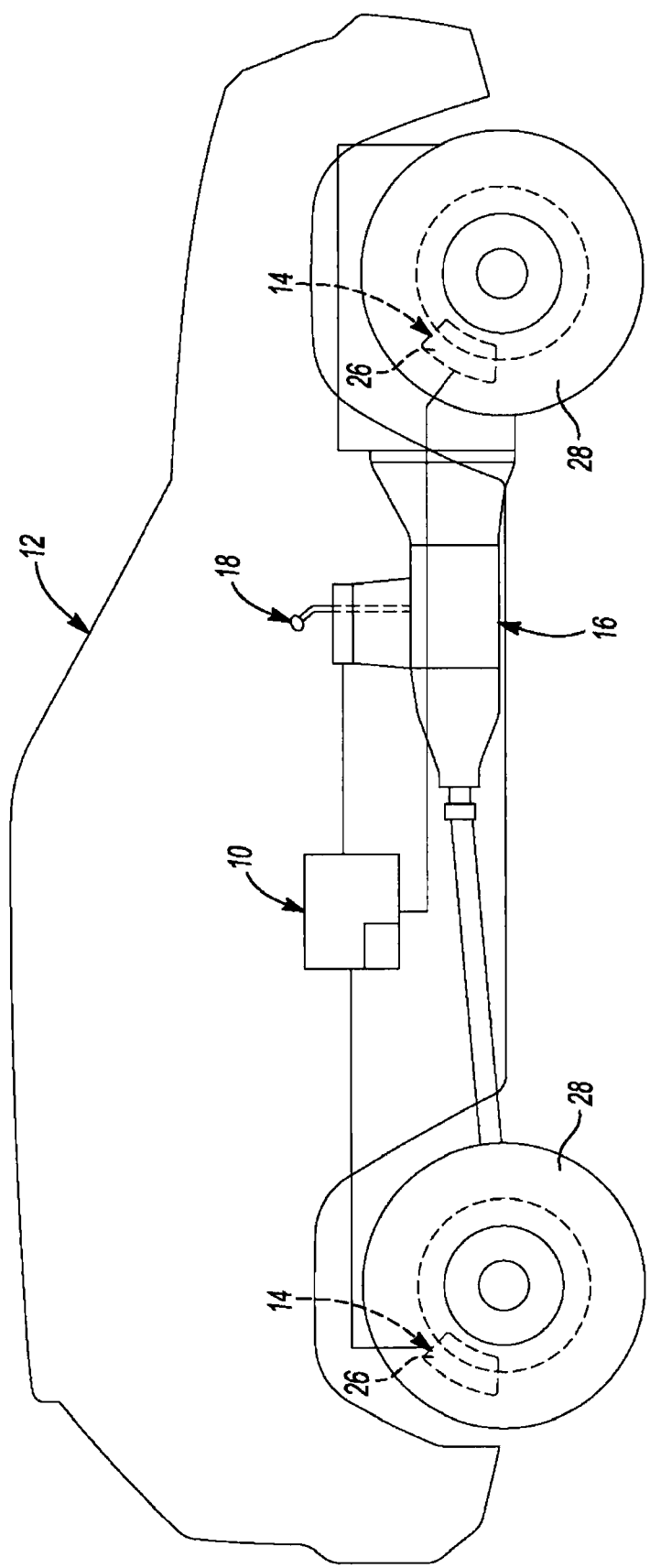
FIG. 1 is a schematic representation of a vehicle incorporating a brake system, a transmission, and a controller in accordance with the principles of the present disclosure.
Figure 2:
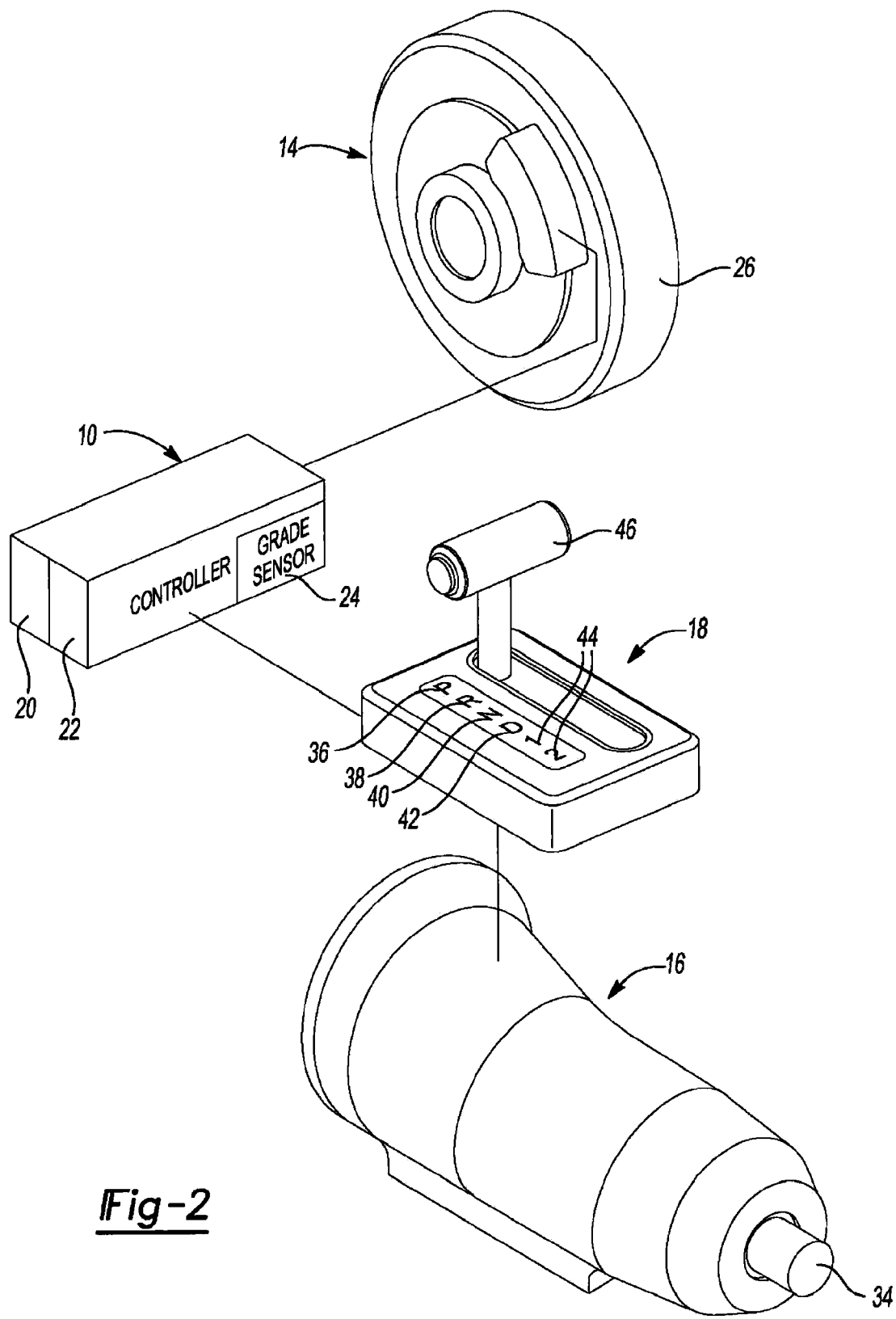
FIG. 2 is a partial schematic representation of the brake system, transmission, and controller of FIG. 1.

With reference to the figures, a controller 10 for use with a vehicle 12 having a brake system 14, a transmission 16, and a gear-select unit 18 is provided. The controller 10 may be in communication with the brake system 14 and gear-select unit 18 to maintain a pressure of brake fluid supplied to the brake system 14 below a threshold pressure required to prevent movement of the vehicle 12 when the controller 10 determines that the brake pressure within the brake system 14 drops below the threshold pressure in combination with the gear-select unit 18 being in a park state.

The controller 10 may include a processor 20 and memory 22 and may be in communication with a grade sensor 24. The controller 10 may be a vehicle controller or, alternatively, may be a controller associated with the brake system 14. In one configuration, the controller 10 may be implemented with an electronic stability control system (ESC) associated with the brake system 14, as the ESC is in communication with and controls the brake system 14.

Figure 4:
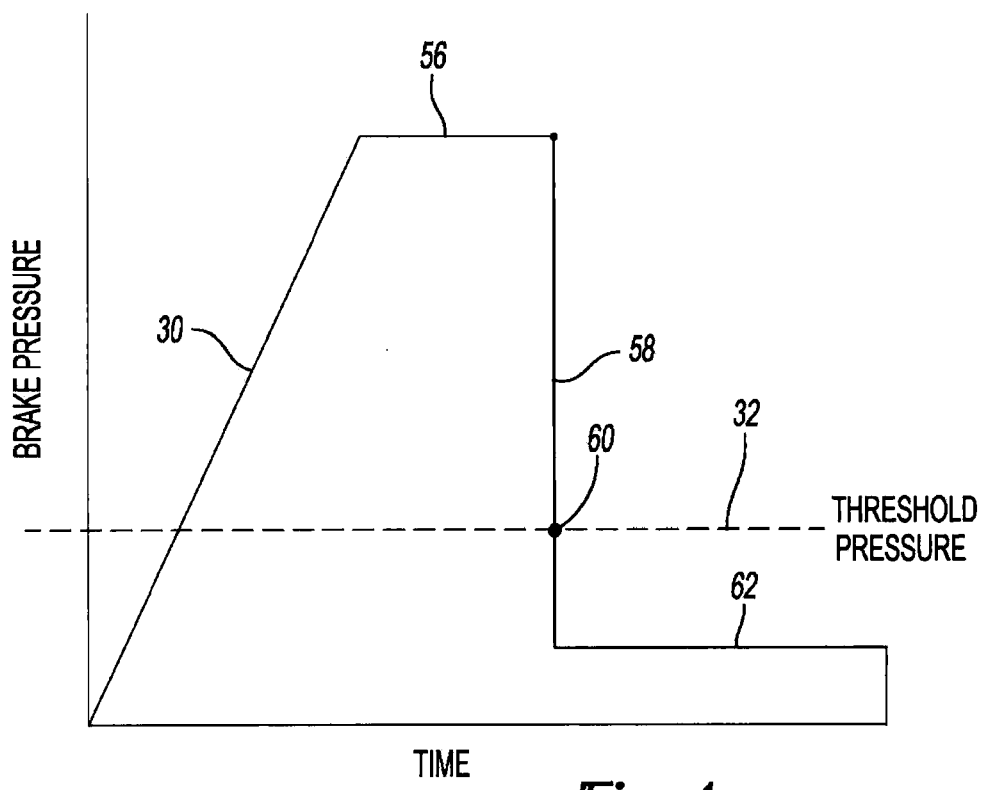
FIG. 4 is a graphical representation of brake pressure over time.

The brake system 14 may include a series of individual brake units 26 respectively associated with wheels 28 of the vehicle 12. The brake system 14 via the ESC or otherwise may selectively increase a pressure of brake fluid within the brake system 14 to apply the brake units 26 and restrict or otherwise prohibit rotation of the wheels 28. Application of the brake units 26 may be controlled manually by a user, for example, by depressing a brake pedal (not shown), or automatically by the ESC. As shown in FIG. 4, when the brake pedal is depressed or the ESC increases a pressure of brake fluid within the brake system 14, the brake pressure increases along line 30. When the pressure exceeds the threshold pressure 32, the pressure within the brake system 14 is sufficient to apply the individual brake units 26 and prevent rotation of one or more wheels 28. As such, provided the brake pressure within the brake system 14 is maintained above the threshold pressure 32, the individual brake units 26 prevent rotation of one or more wheels 28 and, therefore, prevent movement of the vehicle 12. When the brake pressure is at or below the threshold pressure 32, however, the wheels 28 are provided with a degree of braking/resistance but are permitted to roll.

The transmission 16 may include a series of gears and clutches (not shown) that cooperate to provide an output via a transmission shaft 34. In addition to the various gears and clutches, the transmission 16 may also include a parking pawl or sprag that engages an internal gear (neither shown) to prevent rotation of the output shaft 34 and, thus, rotation of the vehicle wheels 28.

The gear-select unit 18 may be in communication with the transmission 16 and may control operation of the transmission 16 depending on a state of the gear-select unit 18. In one configuration, the gear-select unit 18 may be moved between a park state 36, a reverse state 38, a neutral state 40, a drive state 42, and a pair of alternate drive states 44. Moving the gear-select unit 18 between the various states 36-44 likewise causes the transmission 16 to be moved between the various states 36-44. Control of the gear-select unit 18 may be accomplished via an actuation handle 46 and may be electronically communicated to the transmission 16.

Generally speaking, the transmission via transmission shaft 34 provides a rotational force to the wheels 28 of the vehicle 12 if the reverse state 38, drive state 42, or alternate drive states 44 are selected. Likewise, if the park state 36 or neutral state 40 are selected, the transmission 16 does not provide a rotational force to the wheels 28 of the vehicle 12 and, in fact, actually prevents such rotation when in the park state 36.

With particular reference to FIG. 5, operation of the controller 10 will be described in detail. While the methodologies set forth in FIG. 5 will be described in conjunction with a controller 10, the methodology of FIG. 5 could be performed by the ESC of the brake system 14 by implementing the methodology of FIG. 5 in the software of the ESC. Further, while the methodology of FIG. 5 will be described as being performed by the controller 10, the methodology could be implemented in any vehicle control system that is in communication with the brake system 14 and the gear-select unit 18.

In operation, the controller 10 may continue to monitor a state of the transmission 16 by monitoring the gear-select unit 18. While the controller 10 may receive information regarding the state of the transmission from the gear-select unit 18, the controller 10 could alternatively receive the state of the transmission 16 directly from the transmission. Regardless of how the controller 10 determines the state of the transmission, the controller 10 continuously monitors the transmission 16 and/or gear-select unit 18 to determine whether the transmission 16 has been moved from any of the reverse state 38, neutral state 40, drive state 42, or alternate drive states 44 and into the park state at 48.

If the transmission has been moved from any of states 38-44 and into the park state 36, the controller 10 monitors a pressure of the brake fluid within the brake system 14 at 50. The controller 10 determines whether brake pressure is applied to the brake pedal at 52. If pressure is applied to the brake pedal, the controller 10 then monitors the system to determine if the pressure applied to the brake pedal is released, thereby causing the pressure within the brake system to drop at 54.

If the controller 10 determines that the brake pressure within the brake system 14 has dropped, for example, due to release of the brake pedal, the controller 10 continues to monitor the pressure to determine if and when the pressure drops below the threshold pressure 32 (FIG. 4). For example, the controller 10 may first determine an appropriate threshold pressure for a braking event and may then monitor the system to determine when the brake pedal is released. The controller 10 may identify release of the brake pedal when the pressure drops from a fully applied pressure (i.e., line 56 in FIG. 4). The brake pressure may drop along line 58 until reaching the threshold pressure 32 at 64. At this point, the controller 60 may allow the brake pressure to drop below the threshold pressure 32 by a predetermined amount at 66 (FIG. 5).

The controller 10 may maintain the brake pressure below the threshold pressure 32 to allow the vehicle 12 to roll with resistance from the individual brake units 26 at 68. The controller may continue to allow the vehicle 12 to roll with resistance applied by the brake units 26 at a pressure below the threshold pressure (represented by line 62 in FIG. 4) for a predetermined time at 70. Once the predetermined time has elapsed, the controller 10 may release the brake pressure at 72.

Figure 3:
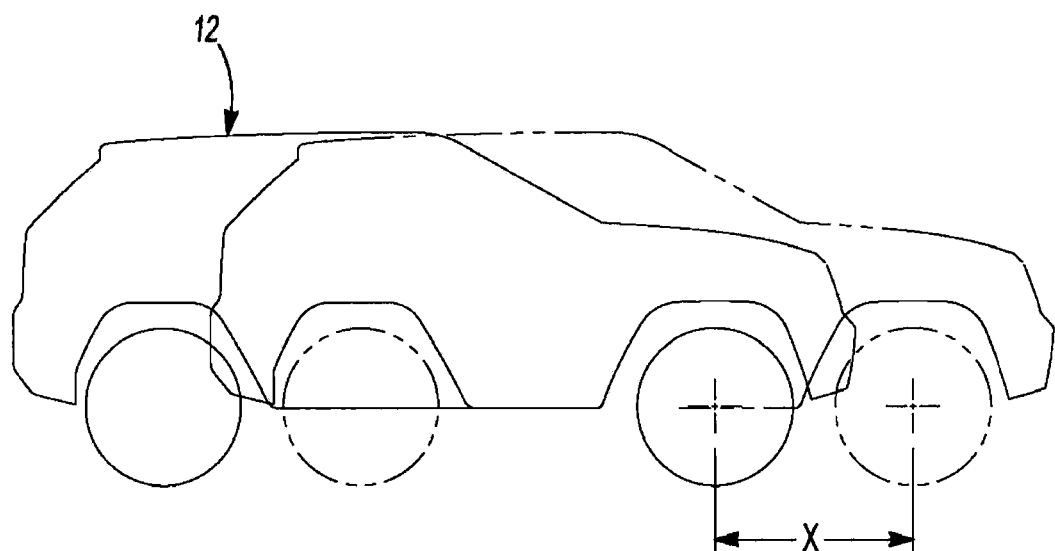
FIG. 3 is a schematic representation of a vehicle illustrating movement of the vehicle following actuation of a gear-shift unit into a park state.

The foregoing methodology may be used to allow the vehicle 12 to roll with resistance applied to one or more wheels 28 via the individual brake units 26 once the gear-select unit 18 is moved into the park state to reduce the speed with which the vehicle 12 rolls and finally comes to rest. Namely, the vehicle 12—if equipped with an automatic transmission 16—is prevented from moving when in the park state 36 due to engagement of the parking sprag and the internal gear of the transmission 16. However, if the parking sprag is not positioned relative to a recess or slot of the internal gear when the gear-select unit 18 is moved into the park state 36, the output shaft 34 of the transmission 16 is permitted to rotate until the parking sprag is received within the recess or slot of the internal gear and, thus, the wheels 28 of the vehicle 12 are permitted to move. Such movement allows the vehicle 12 to move a short distance (X) shown in FIG. 3 following movement of the gear-select unit 18 into the park state 36.

Applying the methodology of FIG. 5 allows the controller 10 to reduce the speed of the vehicle as the vehicle 12 travels the distance (X). The controller 10 may continually monitor the state of the transmission 16 and once the controller 10 determines that the transmission 16 is in the park state 36, will then monitor a pressure of brake fluid within the brake system 14. At the point at which the brake pressure within the brake system 14 drops below the threshold pressure 32 (i.e., represented by reference number 60 in FIG. 4), the controller 10 will maintain a pressure of the brake fluid within the brake system 14 at a pressure below the threshold pressure 32 (i.e., represented by line 62 in FIG. 4) to allow the individual brake units 26 to apply a force to one or more of the wheels 28 to allow the wheels 28 to rotate with drag or resistance. Applying a force to one or more wheels 28 at a predetermined brake pressure below the threshold pressure 32 allows the wheels 28 to rotate but restricts the rotation to reduce the overall speed of the vehicle 12. In so doing, the controller 10 reduces the speed of the vehicle 12 as the vehicle 12 travels the distance (X).

As described above, the controller 10 may permit the vehicle 12 to rotate with the brake system 14 applied at a predetermined pressure below the threshold pressure 32 for a predetermined time period. The predetermined time period may be based on a time required to allow the parking sprag to properly seat within the recess or slot of the internal gear of the transmission 16 and/or may be determined based on a grade experienced by the vehicle 12. The grade experienced by the vehicle 12 may be provided to the controller 10 via the grade sensor 24. The controller 10 may store a relationship between grade and threshold pressure, whereby the threshold pressure is defined as the brake pressure required by the brake system 14 to exert sufficient force on each wheel 28 via the individual brake units 26 to prevent rotation of the wheels 28 and, thus, movement of the vehicle 12 for a particular grade. The controller 10 may store the relationship of grade and threshold pressure within the memory 22 or may otherwise have access to the relationship. Regardless of how the controller 10 accesses the relationship between grade and threshold pressure, the controller 10 may determine the predetermined time by referencing grade data received from the grade sensor 24 on the relationship between grade and threshold pressure to determine the threshold pressure as well as the predetermined time period. The controller 10 may adjust the predetermined time period and/or the threshold pressure to supply the individual brake units 26 with brake fluid at a pressure below the threshold pressure to permit the vehicle 12 to roll with resistance and minimize the speed of the vehicle as the vehicle travels the distance (X).

Minimizing the speed of the vehicle 12 as the vehicle 12 travels the distance (X) decreases the speed of the vehicle 12 and therefore improves the overall feel of the vehicle 12 to a user prior to the vehicle 12 coming to rest. Further, reducing the speed of the vehicle 12 as the vehicle 12 travels the distance (X) reduces the abrupt force typically experienced by a user when the parking sprag engages a recess or slot of the internal gear of the transmission 16 and, therefore, improves the overall operation of the vehicle 12.

What is claimed is:

1. In a vehicle having a transmission, individual brake units respectively associated with wheels of the vehicle, and a source of brake fluid operable to selectively apply the brake units to restrict rotation of the wheels, a controller operable to monitor a pressure of the brake fluid and a state of the transmission, the controller maintaining the brake pressure below a threshold pressure required to prevent movement of the vehicle in response to movement of the transmission into a park state followed by a drop in brake pressure below said threshold pressure to permit the vehicle to roll with resistance for a predetermined time following said drop of brake pressure below said threshold pressure.

2. The controller of claim 1, further comprising a grade sensor in communication with the controller and operable to provide data indicative of a grade experienced by the vehicle.

3. The controller of claim 2, wherein said threshold pressure is determined based on said grade data.

4. The controller of claim 2, wherein the controller has access to a relationship between grade and brake pressure, the controller referencing said grade data on said relationship to determine said threshold pressure.

5. The controller of claim 1, further comprising a gear-shift unit in communication with the transmission and the controller, the controller identifying said park state based on a position of said gear-shift unit.

6. A vehicle comprising:
a brake system including individual brake units respectively associated with wheels of the vehicle and in communication with a source of brake fluid, said brake system operable to prevent movement of the vehicle when said brake fluid is at or above a threshold pressure;
a transmission operable in a plurality of states including a park state; and
a controller in communication with said brake system and said transmission and operable to maintain a pressure of said brake fluid at a pressure below said threshold pressure to apply said brake system and permit the vehicle to move with resistance in response to movement of said transmission into said park state followed by a drop in brake pressure below said threshold pressure.

7. The vehicle of claim 6, wherein said controller maintains said brake pressure below said threshold pressure for a predetermined time period.

8. The vehicle of claim 7, wherein said predetermined time period is initiated from the point when a pressure of said brake pressure drops below said threshold pressure.

9. The vehicle of claim 6, wherein said threshold pressure is determined based on a grade experienced by the vehicle.

10. The vehicle of claim 9, further comprising a grade sensor in communication with said controller and providing said controller with data indicative of said grade.

11. The vehicle of claim 9, wherein said controller references a relationship between grade and brake pressure when determining said threshold pressure.

12. A method comprising:
monitoring by a controller a state of a transmission of a vehicle;
monitoring a pressure of brake fluid supplied to individual brake units respectively associated with wheels of said vehicle;
maintaining said brake pressure at a pressure below a threshold pressure required to prevent movement of said vehicle in response to said transmission being moved into a park state followed by said pressure dropping below said threshold pressure;
maintaining said pressure below said threshold pressure for a predetermined time following said pressure drop below said threshold pressure; and
permitting said vehicle to roll with resistance for said predetermined time.

13. The method of claim 12, further comprising referencing a relationship between grade and brake pressure when determining said threshold pressure.

14. The method of claim 13, further comprising detecting a grade experienced by said vehicle.

15. The method of claim 12, wherein said monitoring said state of said transmission by said controller includes monitoring a position of a gear-shift unit associated with said transmission.

16. The method of claim 12, further comprising reducing said brake pressure to zero following said predetermined time.

* * * * *